United States Patent
Mutz et al.

[11] Patent Number: 5,443,343
[45] Date of Patent: Aug. 22, 1995

[54] METAL DOWEL FOR ANCHORAGE IN THIN WALL PANELS

[75] Inventors: Bernd Mutz, Schopfheim; Klaus Hullmann; Helmo Daler, both of Lorrach, all of Germany

[73] Assignee: A. Raymond GmbH & Co., KG, Lorrach, Germany

[21] Appl. No.: 261,957

[22] Filed: Jun. 17, 1994

[30] Foreign Application Priority Data

Jun. 18, 1993 [DE] Germany ............ 43 20 163.6

[51] Int. Cl.6 .................. F16B 13/04; F16B 13/06
[52] U.S. Cl. .................. 411/30; 411/42; 411/55; 411/61
[58] Field of Search ............ 411/30, 42, 55, 60, 411/61, 63, 64

[56] References Cited

U.S. PATENT DOCUMENTS 3,550,499 12/1970 Eilenberger .................. 411/61
4,500,238 2/1985 Vassiliou .................... 411/30
4,874,277 10/1989 Nowak et al. ................ 411/61
5,100,273 3/1992 Vassiliou .................. 411/30 X

FOREIGN PATENT DOCUMENTS 0274816 5/1990 European Pat. Off. .

Primary Examiner—Neill R. Wilson
Attorney, Agent, or Firm—Finnegan, Henderson, Farabow, Garrett & Dunner

[57] ABSTRACT

A metal dowel for anchorage in a wall panel, said dowel being made from a folded blank of sheet metal and comprising a pair of flat leg members folded over at one end to lie flat against each other, the legs tapering toward the folded end to form a pointed end to the dowel and being held together at said folded end by a breakable web formed by the fold between said legs. The leg members are fixedly connected together at the opposite end to form a head end to the dowel and a threaded hole is formed out of and located between the legs adjacent the head end of the dowel with a funnel-shaped recess formed out of and located between said legs being axially aligned with said threaded hole and located between the threaded hole and the pointed end. After insertion of the dowel pointed end first into a panel, threading of a threaded member into the threaded hole with the tip thereof entering into said recess, breaks the web and forces the legs apart to anchor the dowel in the panel.

6 Claims, 1 Drawing Sheet

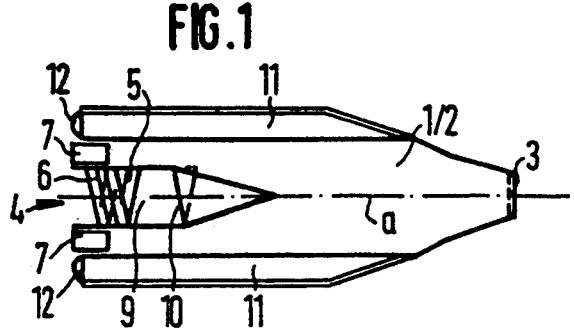
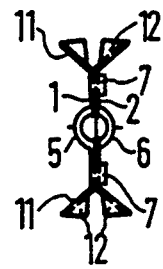
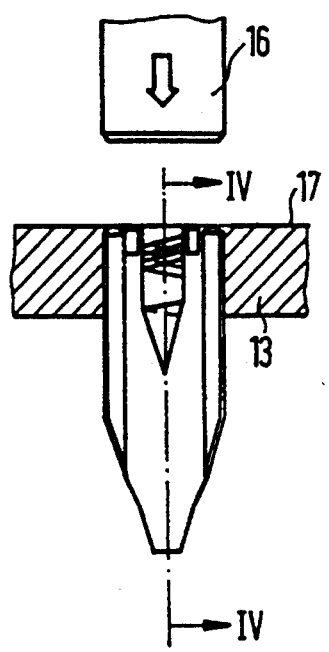
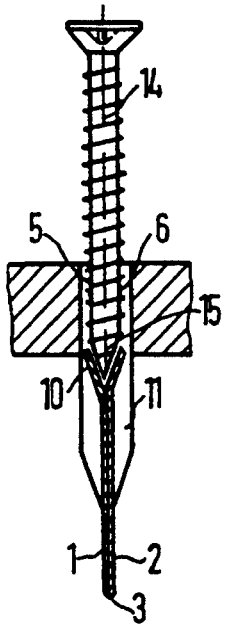
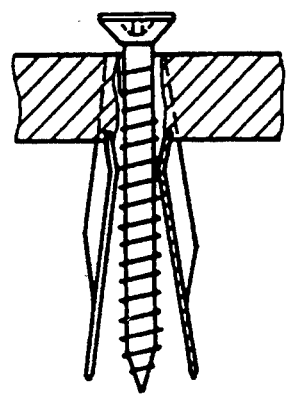
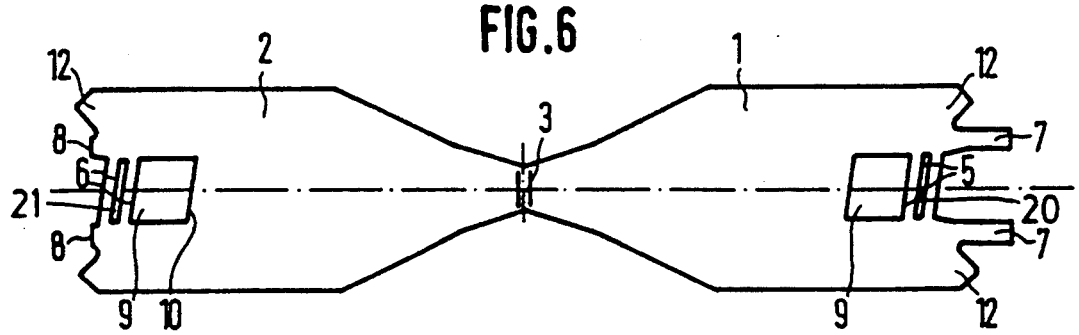

METAL DOWEL FOR ANCHORAGE IN THIN WALL PANELS

BACKGROUND OF THE INVENTION

This invention relates to a metal dowel for anchorage in thin wall panels, especially plasterboard panels.

Metal dowels of this type are typically made from thin sheet steel and essentially comprise two expanding legs pressed flat together, which are configured at one end such that they taper to a point and at the opposite end, the head end, are fixedly joined together. The head end is further provided with a thread region for the screwing in of sheet metal screws or wood screws. Following the thread region, a recess is provided in the expanding legs, the edges of the recess located adjacent the thread region being formed out in a funnel shape to ensure receipt of the tip of the screw.

A metal dowel of this type is known from EP 0 274 816 B1, in which the expanding legs are joined together at the head end by a threaded head plate and protrude from this at a right angle. The metal dowel is driven into a plasterboard panel by means of a hammer, the tips of the legs being to the fore, until the head plate rests against the panel's surface. A screw is then screwed into the thread region of the head plate with the tip of the screw being guided between the expanding legs by the funnel-shaped region at the end of the recess, the expanding legs being forced apart to the point where they become anchored on the back side of the panel.

To ensure that the legs, lying flat one upon the other, stay together while being driven into the panel, a small tab or bar that protrudes from one surface of one leg is forced into a corresponding recess in the other leg, such that there is a temporary connection between the two legs. This is sufficient to hold the legs together as they are driven into the panel. As soon, however, as a sheet metal screw is screwed in between the legs, the tab or bar is pulled out of the recess and the legs are then able to expand as a result of a further screwing in of the screw to produce the desired anchorage.

In the case of this metal dowel, however, one drawback is that the head plate projects over the wall panel by approximately three times the panel's thickness and consequently remains visible when wall hooks are screwed in. In addition, the tab connection between the clamping legs functions only when there is a relatively short leg length. Thus these dowels can only successfully be used in the case of relatively thin plasterboard panels. In the case of thicker or even doubled-up panels on the other hand, where longer expanding legs are required, there is often the risk of the tips of the legs, despite the tab connection, being pushed apart as they are being driven into the panel. In this event, fragments of plaster can break off from the plasterboard panel, so that the anchorage region no longer has the strength necessary to bear the legs of the dowel.

An object of the present invention therefore is to design the above-described metal dowel such that the head end is prevented from jutting out over the surface of the wall panel and the tips of the legs, even in the case of relatively long leg lengths, are held together with absolute reliability as they are being driven into a wall panel. Better screw guidance in the entry between the expanding legs is also desired.

SUMMARY OF THE INVENTION

This object is achieved in accordance with the present invention by providing a metal dowel for anchorage in a wall panel, said dowel being made from a folded blank of sheet metal and comprising a pair of flat leg members folded over at one end to lie flat against each other, said legs tapering toward said folded end to form a pointed end to said dowel and being held together at said folded end by a breakable web formed by said fold between said legs, connecting means for fixedly connecting together the opposite end of each of said legs to form a head end to said dowel, a threaded hole formed out of and located between said legs adjacent said head end of the dowel and a funnel-shaped recess formed out of and located between said legs, said recess being axially aligned with said threaded hole and located between said threaded hole and said pointed end, whereby, after insertion of the dowel pointed end first into a panel, threading of a threaded member into said threaded hole with the tip thereof entering into said recess, breaks said web and forces the legs apart to anchor the dowel in the panel.

BRIEF DESCRIPTION OF THE DRAWINGS

A preferred embodiment of the invention is explained in the drawings and in greater detail below, in which:

FIG. 1 is a side view of the metal dowel of the invention;

FIG. 2 is a top view of the metal dowel looking into the thread region;

FIG. 3 shows the metal dowel after it has been driven into a wall panel;

FIG. 4 is a sectional view taken along the line IV—IV in FIG. 3 and includes a screw screwed down into the dowel as far as the entry funnel;

FIG. 5 is a view similar to FIG. 4, but showing the screw now fully screwed in between the expanding legs; and FIG. 6 shows a punched out sheet metal blank from which the metal dowel is formed.

DETAILED DESCRIPTION OF THE INVENTION

The metal dowel shown in the drawings comprises two expanding leg members 1 and 2 which are made of thin sheet steel and pressed flat against each other by folding the blank shown in FIG. 6 along line 3. For driving them into a wall panel 13, the legs are configured at one end such that they taper to a pointed end and are joined together there, as a tear-off or breakable connection, by a thin bar or web formed out of the blank. At the opposite or head end, the expanding leg members 1 and 2 are fixedly joined together by a connecting means yet to be more specifically described and are provided with a threaded area or region 4, the axis "A" of which extends between expanding legs 1 and 2. This threaded region 4 is formed from two bars 5 and two bars 6 on legs 1 and 2, respectively, that are punched out of each leg leaving a groove 20,21, respectively, between them (See FIG. 6) and then semicircularly shaped so that together, when the blank is folded over along line 3, they form a circular configuration (See FIG. 2). The bars 5,6 are matched in width and pitch to the thread of a screw 14 to be screwed in, so that the threads of the screw will engage in and be held by the grooves 20,21 in the legs between the bars.

As a result of these bars 5 and 6 being formed out of the leg plates, the screw to be screwed in is securely guided and supported in the two thread turns, thus avoiding any oblique emergence of the screw tip from the head end of the metal dowel.

Following bars 5 and 6 is a recess 9 in each leg plate. The edges 10 of the recesses 9, at the end of each recess opposite from the bars 5 and 6, are also semicircular shaped with the portion of the legs adjacent thereto being formed out like a funnel (See FIG. 4). This ensures that the tip 15 of a screw 14 will be guided securely down between the two metal legs 1 and 2 as it is screwed into the threaded region 4 of the dowel.

As can be best seen from the blank in FIG. 6, the connecting means comprises tabs 7 on the head end of one leg 1 on both sides of the holding bars 5. After the expanding legs 1 and 2 have been folded together at bar 3 into a dowel shape, tabs 7 are bent over a corresponding edge 8 on the other leg 2 and pressed down such that the two head ends of the legs 1 and 2 will now be fixedly held together.

To stiffen the expanding legs 1 and 2, angularly disposed and longitudinally extending side ribs 11 are formed on the outer sides of the legs that extend up to the head end of the dowel. The ribs are there bent over to provide transverse protrusions 12 (See FIG. 2). Thus when a dowel is driven into a wall panel 13 by means of a hammer or other device 16, these protrusions 12 will impact against and penetrate slightly into the outer surface 17 of the wall panel 13, so that the head end of the metal dowel will be held by and now be flush with the panel's surface. The protrusions 12 of two adjacent ribs 11 are bent over towards each other, to avoid any risk of injury when using the dowels.

What is claimed is:

1. A metal dowel for anchorage in a wall panel, said dowel being made from a folded blank of sheet metal and comprising a pair of flat leg members folded over at one end to lie flat against each other, said legs tapering toward said folded end to form a pointed end to said dowel and being held together at said folded end by a breakable web formed by said fold between said legs, connecting means for fixedly connecting together the opposite end of each of said legs to form a head end to said dowel, a threaded hole formed out of and located between said legs adjacent said head end of the dowel and a funnel-shaped recess formed out of and located between said legs, said recess being axially aligned with said threaded hole and located between said threaded hole and said pointed end, whereby, after insertion of the dowel pointed end first into a panel, threading of a threaded member into said threaded hole, with the tip thereof entering into said recess, breaks said web and forces the legs apart to anchor the dowel in the panel.

2. The metal dowel of claim 1, wherein said threaded hole is formed from a pair of axially spaced, semicircular shaped bars formed out of each leg member located opposite each other and angularly disposed so as to engage with the thread grooves of the threaded member.

3. The metal dowel of claim 2, wherein the connecting means comprises a pair of spaced, bendable tabs on the head end of one of said legs on both sides of said semicircular shaped bars that are folded over an upper edge on the head end of the other of said legs when said legs are folded flat against each other.

4. The metal dowel of claim 1, including strengthening ribs folded out of said blank and angularly disposed relative to said flat leg members that extend along outer longitudinal sides of the leg members.

5. The metal dowel of claim 4, wherein the ribs extend up to the head end of the dowel and are bent over perpendicular thereto to provide transverse protrusions that will lie against an outer surface of a wall panel when the dowel is inserted into said panel.

6. The metal dowel Of claim 5, wherein the protrusions on adjacent ribs are bent over towards each other.

* * * * *